(12) United States Patent
Gandolfi et al.

(10) Patent No.: US 9,619,153 B2
(45) Date of Patent: Apr. 11, 2017

(54) INCREASE MEMORY SCALABILITY USING TABLE-SPECIFIC MEMORY CLEANUP

(71) Applicant: International Business Machines Corporation, Armonk, NY (US)

(72) Inventors: Federico A. Gandolfi, Markham (CA); Askari H. Naqvi, Aurora (CA)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 14/659,708

(22) Filed: Mar. 17, 2015

(65) Prior Publication Data

US 2016/0274799 A1    Sep. 22, 2016

(51) Int. Cl.
  *G06F 12/00* (2006.01)
  *G06F 3/06* (2006.01)
  *G06T 11/20* (2006.01)

(52) U.S. Cl.
  CPC ............ *G06F 3/0608* (2013.01); *G06F 3/065* (2013.01); *G06F 3/067* (2013.01); *G06F 3/0619* (2013.01); *G06F 3/0641* (2013.01); *G06T 11/206* (2013.01)

(58) Field of Classification Search
  CPC .................................................... G06T 11/206
  USPC ......................................................... 711/162
  See application file for complete search history.

(56) References Cited

U.S. PATENT DOCUMENTS 8,381,224 B2    2/2013  Huetter et al.
8,386,717 B1    2/2013  Banerjee et al.
2010/0174863 A1    7/2010  Cooper et al.
2012/0137059 A1    5/2012  Yang et al.
2013/0226882 A1    8/2013  Jaiswal et al.

OTHER PUBLICATIONS

IBM, "How to manage the size of your database in Rational Synergy," IBM Support Portal, Last Modified on Apr. 15, 2014, p. 1-4, http://www-01.ibm.com/support/docview.wss?uid=swg21618321, Accessed on Feb. 9, 2015.
Mell et al., "The NIST Definition of Cloud Computing," National Institute of Standards and Technology, Information Technology Laboratory, Oct. 7, 2009, Version 15.
Oracle, "Moving a Table to a New Segment or Tablespace," Oracle® Database Administrator's Guide, Mar. 2008, p. 18-22-18-23, Part III Schema Objects, Chapter 18 Managing Tables, Altering Tables Section, 11g Release 1 (11.1).

*Primary Examiner* — Mardochee Chery
(74) *Attorney, Agent, or Firm* — Patricia B. Feighan

(57) ABSTRACT

A method to increase memory scalability using a table-specific memory cleanup is provided. The method may include determining whether a specific table within a set of tables is a candidate for elimination. The method may also include unloading a plurality of respective metadata associated with the specific table in response to the determination that the specific table is a candidate for elimination, whereby unloading the plurality of respective metadata includes temporarily deactivating the table. The method may further include creating a point-in-time snapshot copy of the respective metadata associated with the specific table. The method may also include saving the created point-in-time snapshot on a disk. The method may include detecting an access of the specific table. The method may also include constructing a plurality of respective table metadata structures using the saved created point-in-time snapshot, whereby the constructing is in response to detecting the access of the specific table.

20 Claims, 6 Drawing Sheets

INCREASE MEMORY SCALABILITY USING TABLE-SPECIFIC MEMORY CLEANUP

BACKGROUND

The present invention relates generally to the field of computers, and more particularly to relational database management distributed systems.

Computer memory can be an expensive and scarce resource. As such, memory caching is one of most frequently used methods to improve application performance by cutting down on the loading/unloading of large memory objects, such as tables, indexes, table ingest metadata, table compression metadata etc. The need for keeping such large objects in memory is practical and has been proven to consistently show desired performance results. One of the examples is when a user regularly ingests data into a table while querying the same table. This popular high concurrency scenario fulfills the very practical need for most-up-to-date data analytics.

SUMMARY

According to one embodiment, a method to increase memory scalability using a table-specific memory cleanup is provided. The method may include determining whether a specific table within a set of tables is a candidate for elimination. The method may also include unloading a plurality of respective metadata associated with the specific table in response to the determination that the specific table within the set of tables is a candidate for elimination, whereby unloading the plurality of respective metadata includes temporarily deactivating the table. The method may further include creating a point-in-time snapshot copy of the respective metadata associated with the specific table. The method may also include saving the created point-in-time snapshot on a disk. The method may additionally include detecting an access of the specific table. The method may also include constructing a plurality of respective table metadata structures using the saved created point-in-time snapshot, whereby the constructing is in response to detecting the access of the specific table.

According to another embodiment, a computer system to increase memory scalability using a table-specific memory cleanup is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include determining whether a specific table within a set of tables is a candidate for elimination. The method may also include unloading a plurality of respective metadata associated with the specific table in response to the determination that the specific table within the set of tables is a candidate for elimination, whereby unloading the plurality of respective metadata includes temporarily deactivating the table. The method may further include creating a point-in-time snapshot copy of the respective metadata associated with the specific table. The method may also include saving the created point-in-time snapshot on a disk. The method may additionally include detecting an access of the specific table. The method may also include constructing a plurality of respective table metadata structures using the saved created point-in-time snapshot, whereby the constructing is in response to detecting the access of the specific table.

According to yet another embodiment, a computer program product to increase memory scalability using a table-specific memory cleanup is provided. The computer program product may include one or more computer-readable storage devices and program instructions stored on at least one of the one or me tangible storage devices, the program instructions executable by a processor. The computer program product may include program instructions to determine whether a specific table within a set of tables is a candidate for elimination. The computer program product may also include program instructions to unload a plurality of respective metadata associated with the specific table in response to the determination that the specific table within the set of tables is a candidate for elimination, whereby unloading the plurality of respective metadata includes temporarily deactivating the table. The computer program product may further include program instructions to create a point-in-time snapshot copy of the respective metadata associated with the specific table. The computer program product may also include program instructions to save the created point-in-time snapshot on a disk. The computer program product may additionally include program instructions to detect an access of the specific table. The computer program product may also include program instructions to construct a plurality of respective table metadata structures using the saved created point-in-time snapshot, whereby the constructing is in response to detecting the access of the specific table.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
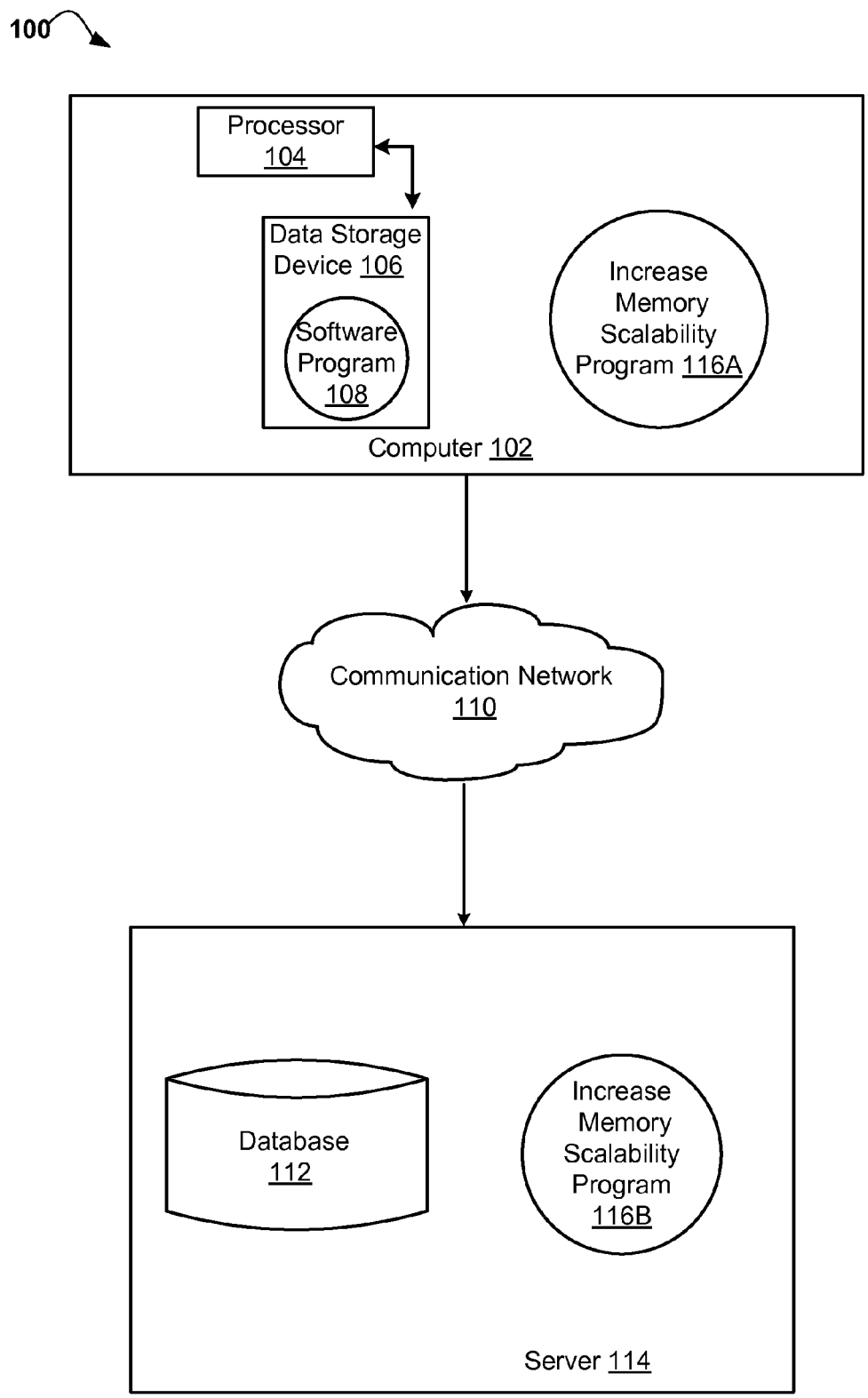
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to relational database management distributed systems. More specifically, the present embodiment relates to high performance in-memory analytics database systems. Such systems differ from more classical systems among other parameters by the intensive use of memory towards compression and ingestion friendly metadata. Therefore, the present embodiment has the capacity to improve the technical field of high performance in-memory analytics database systems by delivering on user value proposition while reconciling with the finite amount of memory available on the system.

As previously described, computer memory can be an expensive and scarce resource. As such, memory caching is one of most frequently used methods to improve application performance by cutting down on the loading/unloading of large memory objects. The need for keeping such large objects in memory is practical and has been proven to consistently show desired performance results. However, when the number of such tables grow, their usage may become rare or unpredictable, and therefore, keeping table-specific metadata in active memory may severely hurt application scalability and even performance.

Furthermore, there may be a need to have all the tables in a database available at any time for high performance analytics, ingests and other tasks against said tables. Typically an in-memory database system loads every table's metadata required by multiple applications into memory, but not all applications rely on all of these tables at any given time, or even during a specific period of a week, or a month. The desire to cache metadata for improved throughput in high performance in-memory analytics database systems may inadvertently reduce overall system memory capacity, concurrency and scalability. Therefore, an automatic/manual mechanism is needed to mitigate and rectify the problem. As such, it may be advantageous, among other things, to increase memory scalability using table-specific memory cleanup. Additionally, such an implementation of increasing the memory scalability using table-specific memory cleanup may be utilized for applications working on business models that are seasonal or cyclical in nature.

According to at least one implementation, the present embodiment may provide a two-tier method using table-specific intelligent cleanup and swapping with FlashCopy-like methodology in order to increase memory scalability. FlashCopy is an IBM feature supported on various IBM storage devices that made it possible to create, nearly instantaneously, point-in-time snapshot copies of entire logical volumes or data sets. As such, the present embodiment may optimize the competing need for obtaining more overall work throughput vs. the low total cost of ownership (TCO) of hardware. Therefore, the present embodiment may allow users of in-memory databases to increase the efficiency of available physical memory to run through more work in parallel. Also, the present embodiment may allow database developers and administrators to keep higher number of wider tables active in memory for overall faster access.

For example, there may be a database that contains one hundred tables of varying sizes in terms of number of columns, types of columns and the amount of data in each table. (e.g., DATABASE [Table1 . . . Table100]). In any given database system, two of the most frequent database operations are data retrieval and ingestion. As such, in order to perform data retrieval effectively, a typical database system would require table metadata, such as table control structures, control blocks, compression structures and compression dictionaries to be loaded into memory for each accessed table. When an application retrieving data from a table connects and executes a user query, table metadata is cached into memory and kept there for as long as the database is active. This provides performance advantages as well as memory management challenges as a database system is intrinsically unable to predict usage pattern on its data. Yet the memory available to optimize performance is finite.

Similar to data retrieval activities, data ingestion into a table requires a database system to load table ingestion metadata such as data ranges, ingestion buffers, table control structures, etc. into memory. This metadata is also cached and kept there for performance benefits for as long as the database remains active.

Therefore, as stated above, the total amount of memory-resident metadata required for both data retrieval and data ingestion for each table depends on the number of table columns, column data types, number of rows in the table, compression type, data ranges etc. For example, compressing a fixed-length data column may require less metadata for compression than required for compressing a varying-length data column. Similarly for data ingestion, inserting rows into a varying-length column with higher number of data ranges may require more memory. Hence, for some tables, the size of metadata may very well be in hundreds of megabytes.

Two typical use-case scenarios may be as follows:
Scenario 1:
Given TableX (where $x=\{1 \ldots n\}$) is ingested once and accessed frequently $$\text{Total Cached Metadata} = \text{SUM}(\text{Table}X\{1 \ldots n\}[\text{Retrieval Metadata} + \text{Ingestion Metadata}])$$

Where n is the number of ingest-once-access-often tables in a database.

As per the above scenario, the ingestion metadata loaded for such one-time-ingestion tables may be wasting memory to the amount calculated. However, according to at least one implementation of the present embodiment, the wasted memory amount may be released if more memory is needed by the system.

Scenario 2:
TableX (where $x=\{1 \ldots n\}$) has never been ingested (e.g., it was loaded or imported) but is accessed frequently Thus, as compared to Scenario 1, the present embodiment may save on the ingestion metadata, but still see the caching cost for retrieval.

$$\text{Total Cached Metadata} = \text{SUM}(\text{Table}X\{1 \ldots n\}[\text{Retrieval Metadata}])$$

Where n is the number of ingest-never-access-often tables in the database.

As such, according to the present embodiment, once table metadata is cached upon by first being accessed or ingested, the table metadata is kept there for the sake of performance gains. If a table has been ingested or accessed once, it's only natural for a database system to expect that it will be accessed or ingested again, soon. This requires assuming the availability of infinite memory.

In some use-case scenarios, a table ingestion or access can be seasonal or cyclic meaning that the users or applications may not need the table for an extended period of time. One example of this may be end-of-week reports generation. In large-scale 24/7/365 data warehouses where the number of tables are in thousands, caching large metadata for inactive tables can severely hurt system scalability. With respect to the example database described above, there are only one hundred tables. If the average retrieval metadata size is 30 MB and average ingestion metadata size is 70 MB, there may be 10 GB of system memory committed forever whether these tables are ever used or not.

As such, the present embodiment may provide a manual, as well as an automatic mechanism to cleanup, unload, and reload retrieval and ingestion metadata, both together and separately depending on the user-driven policy for their metadata management.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to increase memory scalability using table-specific clean-up. Therefore, in case a table in a database is not going to be either ingested or accessed for an extended period of time as decided by database administrators or application programmers, the present embodiment may enable them to completely clean out all table metadata from memory and make space for other critical database memory heaps, such as, but not limited to other active table metadata, sort heaps, package cache, locklist, bufferpools, etc. improving the overall scalability of the system. Additionally, according to at least one implementation, the table metadata structures will be automatically constructed the next time the table is accessed.

Furthermore, the present embodiment may provide metadata swapping with FlashCopy like methodology. As such, in a case where a table needs to be temporarily deactivated, a nearly instantaneously, point-in-time snapshot copy of entire table metadata can be created and saved on disk for faster reloading. Computer memory is an expensive and scarce resource. Loading or re-loading table metadata into memory is expensive but it is far less expensive than keeping large inactive objects in memory indefinitely. Therefore, the present embodiment may provide a mechanism to page out both retrieval and ingestion metadata deemed by the user (through a command, or automated through a heuristic) of the system onto disk, to be flash copied back into memory when the importance of the table changes in relative terms.

Additionally, the present embodiment may provide automatic detection for cleanup or swapping. As such, the present embodiment may provide a mechanism to allow users to create a time-based policy for automatic detection and ejection of inactive tables from memory. Therefore, a database administrator may be able to specify a time-period in hours, days, weeks or months after which a cleanup or swapping daemon will be activated to perform the required tasks automatically keeping the system self-managed, self-tuned and self-organized.

An example implementation of EXTERNALS may be as follows:

---

- ALTER TABLE <TBNAME> <RETIRE, INACTIVE>
  o <RETIRE>: Cleans out both ingest and compression metadata from memory
  o <INACTIVE>: Swaps out both ingest and retrieval metadata using flash copy for faster re-access
  o
- ALTER TABLE <TBNAME> INGEST-STATE <RETIRE, INACTIVE>
  o <RETIRE>: Cleans out ingest metadata from memory
  o <INACTIVE>: Swaps out ingest metadata using flash copy for faster re-access
  o <ACTIVE:default>: Reloads or swaps in ingest metadata
  o
- ALTER TABLE <TBNAME> ACCESS-STATE <RETIRE, INACTIVE>
  o <RETIRE>: Cleans out retrieval metadata from memory
  o <INACTIVE>: Swaps out retrieval metadata using flash copy for faster re-access
  o <ACTIVE:default>: Reloads or swaps in retrieval metadata

---

Therefore, as previously described, the above database commands may be issued as user interrupts by database administrators (DBAs), from system authority, or executed as part of an automated program keyed on the "last used" attribute of a table as per criteria set a priority and updated as required. When prioritizing or selecting between various table metadata to be eliminated, preference may be given to elimination of wider tables first.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an Increase Memory Scalability Program 116A. The networked computer environment 100 may also include a server 114 that is enabled to run an Increase Memory Scalability Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Increase Memory Scalability Program 116B running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Increase Memory Scalability Program 116A, 116B may interact with a database 112 that may be embedded in various storage devices, such as, but not limited to a computer/mobile device 102, a networked server 114, or a cloud storage service.

As previously described, the client computer 102 may access the Increase Memory Scalability Program 116B, running on server computer 114 via the communications network 110. For example, a user (of an in-memory database) using a client computer 102 may use the Increase Memory Scalability Program 116A, 116B to increase the efficiency of available physical memory run through more work in parallel by increasing memory scalability using table-specific memory cleanup. As such, the Increase Memory Scalability Program 116A, 116B, may allow database developers and administrators to keep a higher number of wider tables active in memory for overall faster access. The Increase Memory Scalability method is explained in more detail below with respect to FIG. 2A-2B.

Figure 2A:
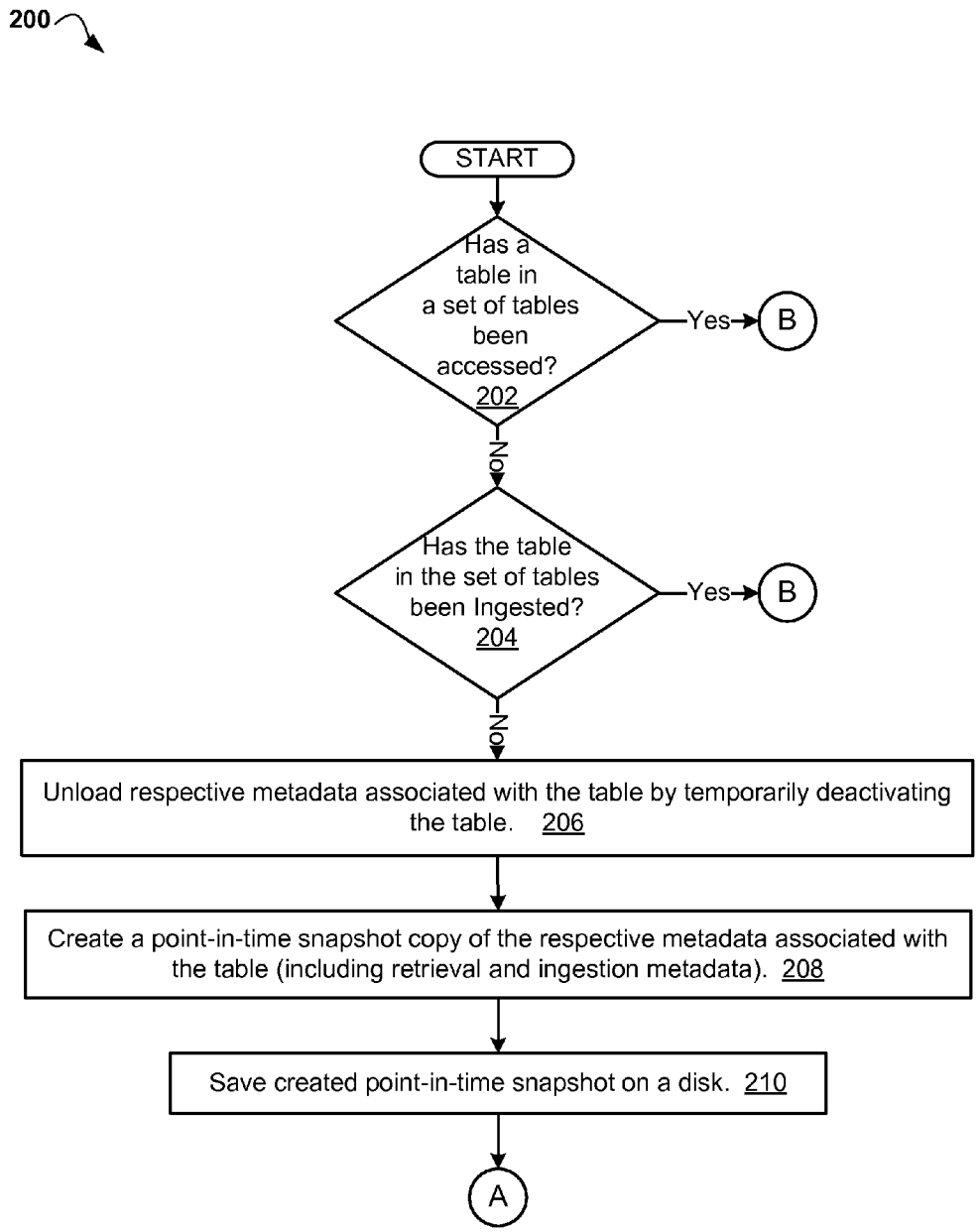
FIGS. 2A-2B are an operational flowchart illustrating the steps carried out by a program to increase memory scalability according to at least one embodiment.
Figure 2B:
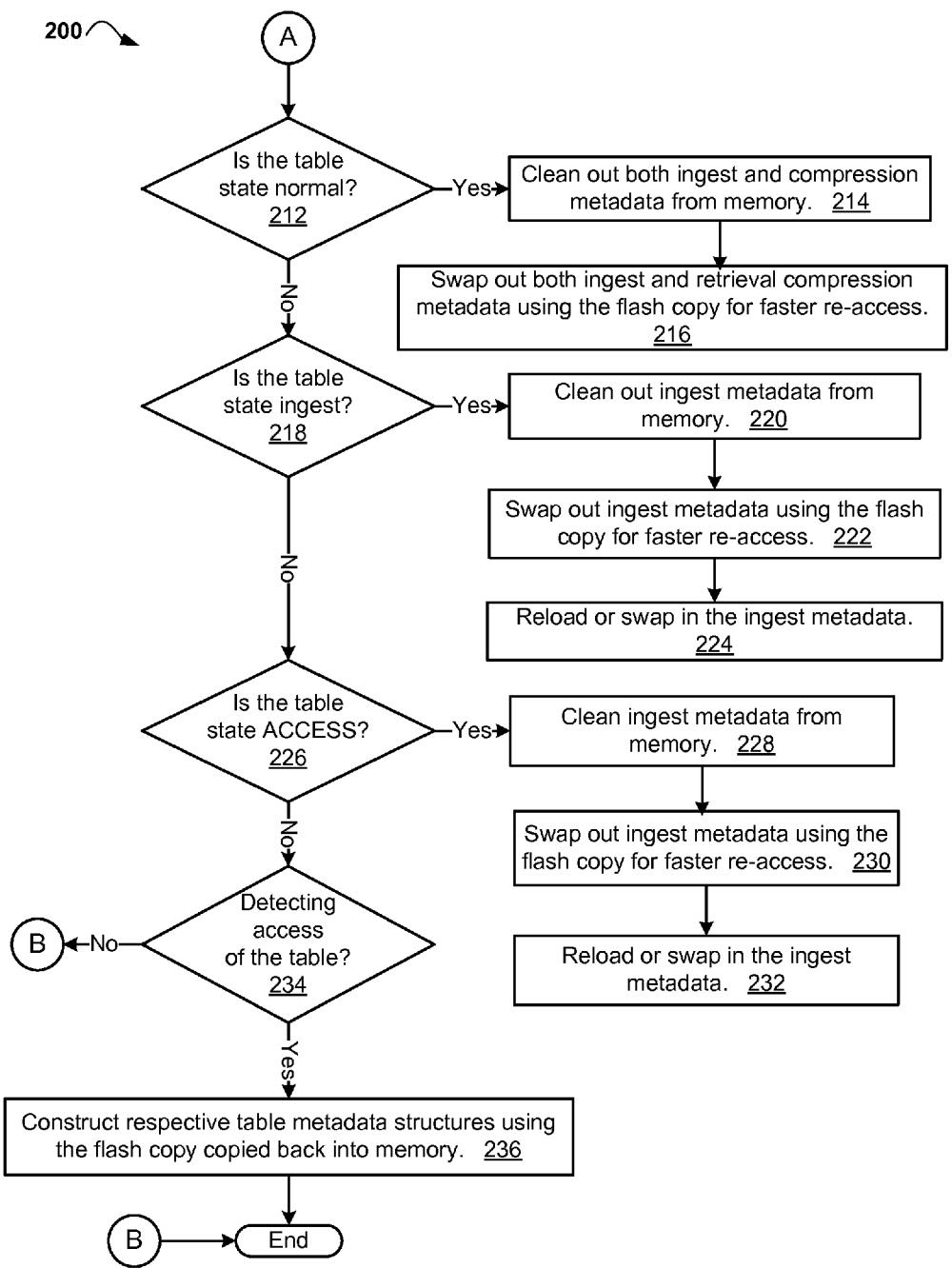

Referring now to FIG. 2A-2B, an operational flowchart 200 illustrating the steps carried out by an Increase Memory Scalability Program. As previously described, the Increase Memory Scalability Program 116A, 116B (FIG. 1) may increase memory scalability using table-specific memory cleanup.

Therefore with respect to FIG. 2A-2B at 202, the Increase Memory Scalability Program 116A, 116B (FIG. 1) will determine whether a table in a set if tables has not been accessed. If at 202, it is determined that a table in a set if tables has been accessed, then the method may end.

However, if at 202, it is determined that a table in a set if tables has not been accessed, then at 204, the Increase Memory Scalability Program 116A, 116B (FIG. 1) will determine whether a table in a set if tables has not been ingested. If at 204, it is determined that a table in a set if tables has been ingested, then the method may end.

According to at least one implementation, the Increase Memory Scalability Program 116A, 116B (FIG. 1) may determine whether a specific table within a set of tables has not been accessed or ingested in accordance with a selected policy. The selected policy may be configurable and pre-defined and the determining may be manually activated using a command, or it may be automated using a heuristic including the use of a "last used" attribute of the specific table. Furthermore, the selected policy may be a time-based policy for automatic detection and ejection of inactive tables from memory and the prioritization or selection between various table metadata as a candidate for elimination, may prefer wider tables first.

However, if at 204, it is determined that a table in a set if tables has not been ingested, then the Increase Memory Scalability Program 116A, 116B (FIG. 1) will proceed to step 206 to unload the respective metadata associated with the table by temporarily deactivating the specific table. As such, based on the preceding steps 202 and 204, the Increase Memory Scalability Program 116A, 116B (FIG. 1) has determined that a specific table in the set of tables is a candidate for elimination, in accordance with the selected policy, and therefore, may unload respective metadata associated with the specific table.

Next at 208, the Increase Memory Scalability Program 116A, 116B (FIG. 1) will create a point-in-time snapshot copy of the respective metadata associated with the table (including retrieval and ingestion metadata). As such, according to at least one implementation, after the specific table is temporarily deactivated, a point-in-time snapshot copy of the respective metadata associated with the specific table, including both retrieval and ingestion metadata, is created.

Then at 210, the created point-in-time snapshot is saved on disk. Saving the created point-in-time snapshot on a disk may facilitate faster reloading of the respective metadata. Next, at 212, it is determined whether a table state is normal. If at 212 it is determined that the table state is normal, then the method will proceed to step 214 to clean out both ingest and compression metadata from memory. According to at least one implementation, when a table state is normal, a <RETIRE> option may clean out both ingest and compression metadata from memory.

Then at 216, according to at least one implementation, when a table state is normal, the present embodiment may swap out both ingest and retrieval compression metadata using the flash copy for faster re-access. According to at least one implementation, when a table state is normal, an <INACTIVE> option may swap out both ingest and retrieval metadata using the flash copy for faster re-access.

However, if at 212 it is determined that the table state is not normal, then the method will proceed to step 218 and determine whether the table state is ingest. If at 218 it is determined that the table state is ingest, then the method may proceed to step 220 to clean out ingest metadata from memory. According to at least one implementation, when a table state is ingest, the <RETIRE> option may clean out ingest metadata from memory.

Next at 222, the Increase Memory Scalability Program 116A, 116B (FIG. 1) will swap out ingest metadata using the flash copy for faster re-access. According to at least one implementation, the <INACTIVE> option may swap out ingest metadata using flash copy for faster re-access.

Then at 224, the Increase Memory Scalability Program 116A, 116B (FIG. 1) will reload or swap in the ingest metadata. According to at least one implementation, an <ACTIVE> option may be used to reload or swap in the ingest metadata.

However, if at 218 it is determined that the table state is not ingest, then the method will proceed to step 226 and determine whether the table state is ACCESS. If at 226, it is determined that the table state is ACCESS, then the method may proceed to step 228 to clean ingest metadata from memory. According to at least one implementation, the <RETIRE> option may clean out ingest metadata from memory.

Then at 230, the Increase Memory Scalability Program 116A, 116B (FIG. 1) will swap out ingest metadata using the flash copy for faster re-access. According to at least one implementation, the <INACTIVE> option may swap out ingest metadata using flash copy for faster re-access.

Then at 232, the Increase Memory Scalability Program 116A, 116B (FIG. 1) will reload or swap in the ingest metadata. According to at least one implementation, the <ACTIVE> option may be used to reload or swap in the ingest metadata.

However, if at 226, it is determine that the table is not in the state of ACCESS, then the method may proceed to step 234 to determine whether any access of the table is detected. If at 234, no access of the table is detected, then the method may end.

However, if at 234 access of the table is detected, then the method will proceed to step 236 to construct respective table metadata structures using the flash copy copied back into memory. According to at least one implementation, in response to detecting access of the specific table, the Increase Memory Scalability Program 116A, 116B (FIG. 1) may automatically construct respective table metadata structures using the flash copy copied back into memory.

It may be appreciated that FIG. 2A-2B provides only an illustration of one implementation and does not imply any limitations with regard to how different embodiments may be implemented. Many modifications to the depicted environments may be made based on design and implementation requirements. For example, the present embodiment may allow database developers and administrators to keep higher number of wider tables active in memory for overall faster access. Additionally, with respect to tables not going to be either accessed or ingested or both, the Increase Memory Scalability Program 116A, 116B (FIG. 1) may allow a user to completely unload their metadata, free up memory and improve system capacity, concurrency and scalability allowing more applications to run simultaneously using Metadata Swapping with FlashCopy like methodology Automatic Detection for cleanup or swapping, as previously described.

Additionally, the present embodiment may eliminate metadata from memory to allow for the availability of the eliminated memory to be used for processes that are increasing system capacity and therefore are able to take on more work with same memory. Furthermore, the present embodiment may provide the choice of user or program driven implementation, given thresholds of "last used" or memory utilization levels, or a combination thereof.

Also, the present embodiment may increase the capacity and scalability of physical memory and is applicable to in-memory database analytics, including but not limited to, mining and acting upon tables (and associated memory) given changing patterns of usage over life cycle of the application.

Figure 3:
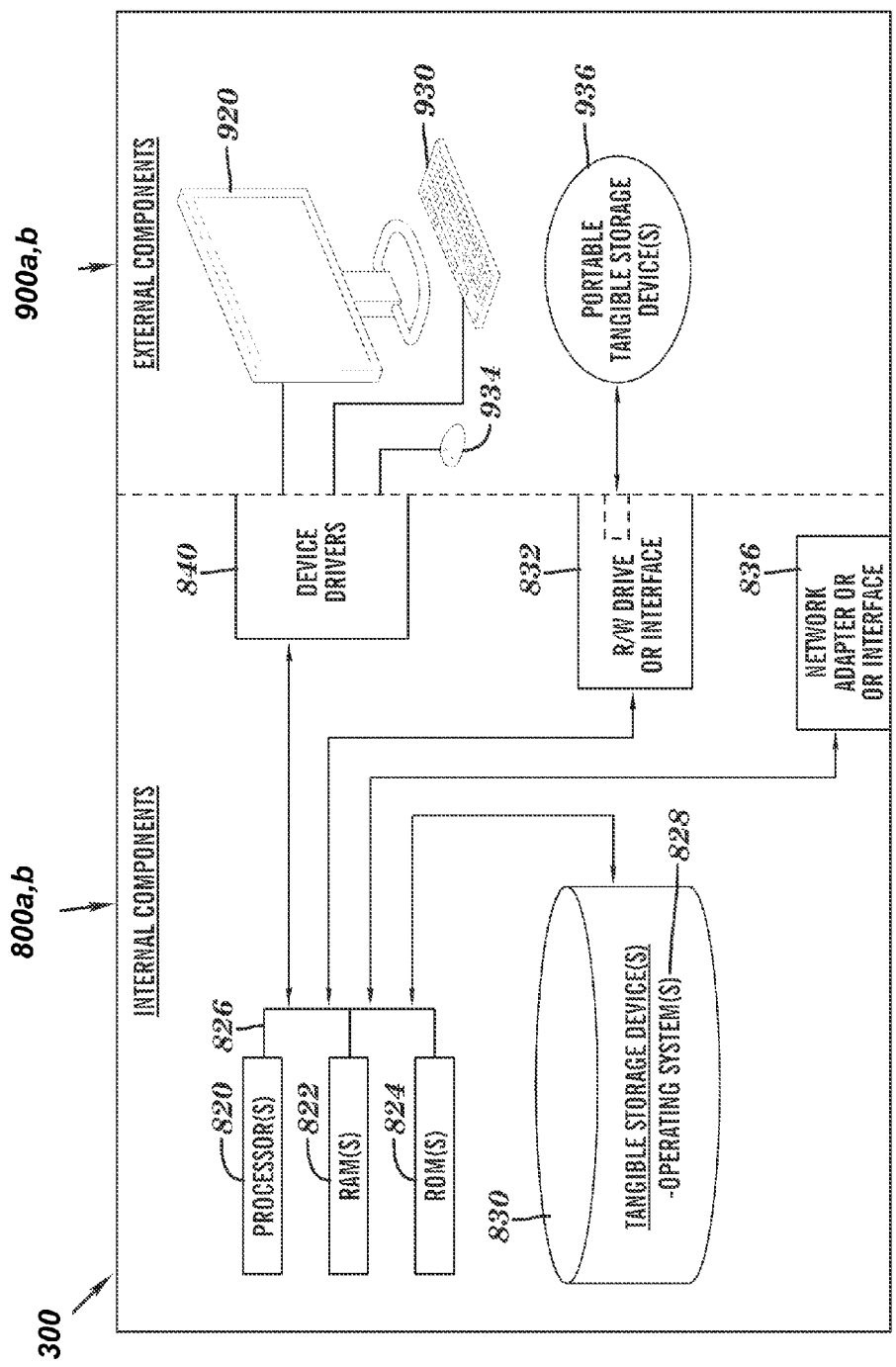
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Increase Memory Scalability Program 116A (FIG. 1) in client computer 102 (FIG. 1) and the Increase Memory Scalability Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Increase Memory Scalability Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Increase Memory Scalability Program 116A (FIG. 1) in client computer 102 (FIG. 1) and the Increase Memory Scalability Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Increase Memory Scalability Program 116A (FIG. 1) in client computer 102 (FIG. 1) and the Increase Memory Scalability Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
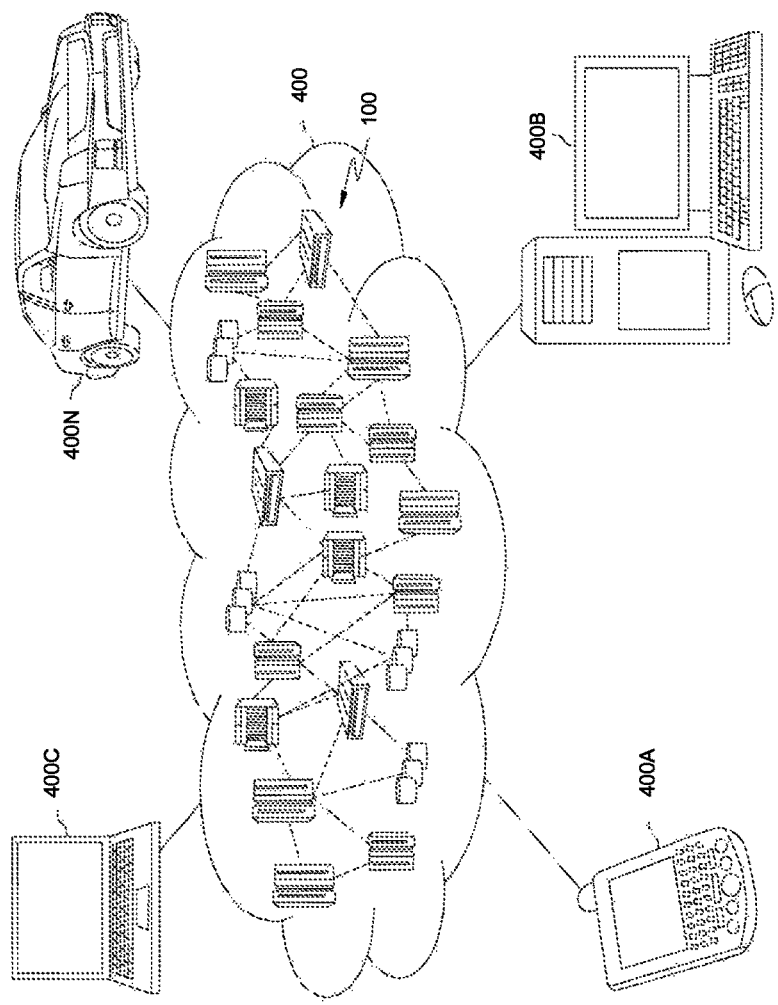
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
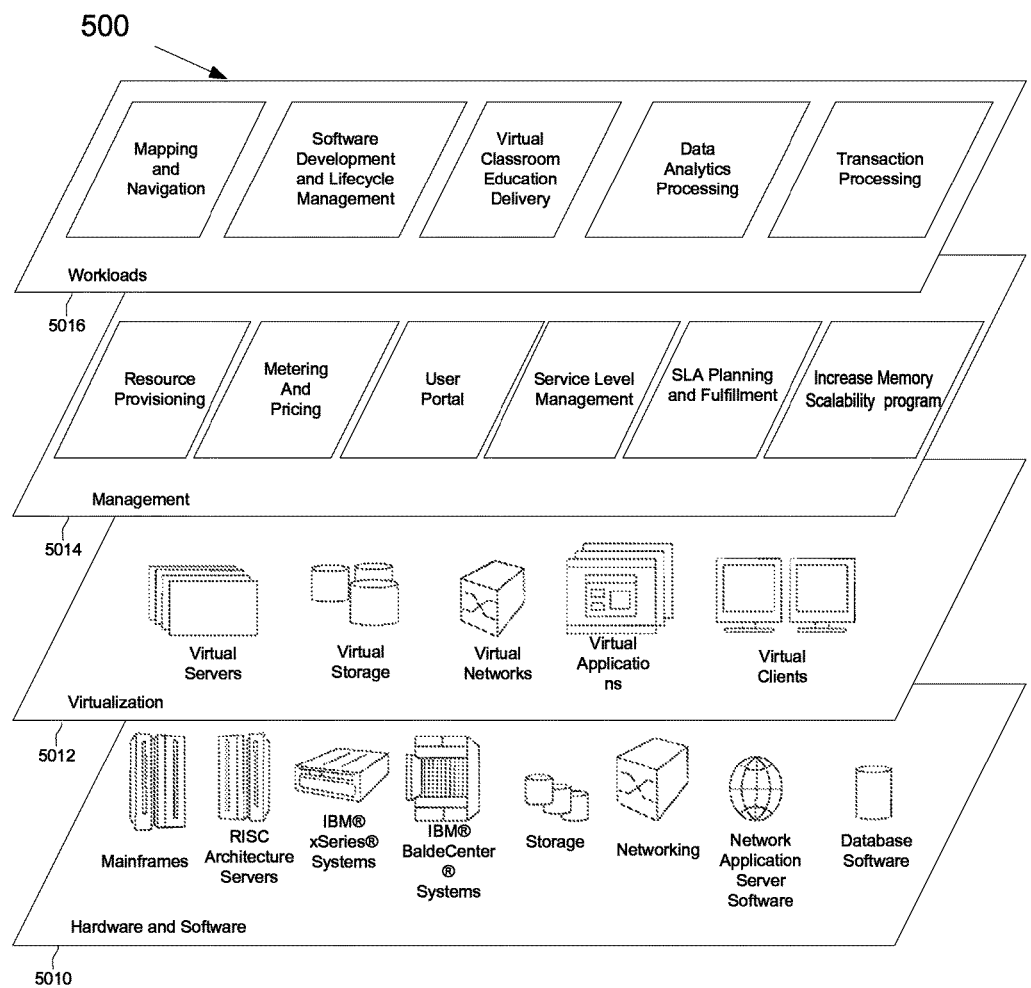
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 5010 includes hardware and software components. Examples of hardware components include: mainframes; RISC (Reduced Instruction Set Computer) architecture based servers; storage devices; networks and networking components. In some embodiments, software components include network application server software.

Virtualization layer 5012 provides an abstraction layer from which the following examples of virtual entities may be provided: virtual servers; virtual storage; virtual networks, including virtual private networks; virtual applications and operating systems; and virtual clients.

In one example, management layer 5014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An Increase Memory Scalability Program may increase memory scalability using table-specific memory cleanup.

Workloads layer 5016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to increase memory scalability using a table specific memory cleanup, the method comprising:
    determining whether a specific table within a set of tables is a first candidate for elimination;
    in response to determining the specific table within the set of tables is the first candidate for elimination, determining whether the specific table within the set of tables has a greater width than at least one other table within the set of tables that is a second candidate for elimination;
    eliminating the specific table and unloading a plurality of respective metadata associated with the specific table in response to the determination that the specific table within the set of tables is the first candidate for elimination and in response to determining that the specific table within the set of tables has the greater width than the at least one other table within the set of tables that is the second candidate for elimination, wherein unloading the plurality of respective metadata includes temporarily deactivating the first table that has the greater width;
    creating a point-in-time snapshot copy of the respective metadata associated with the first table that has the greater width;
    saving the created point-in-time snapshot on a disk;
    detecting an access of the first table that has the greater width; and
    constructing a plurality of respective table metadata structures using the saved created point-in-time snapshot, wherein the constructing is in response to detecting the access of the first table that has the greater width.

2. The method of claim 1, wherein determining whether the first table that has the greater width within the set of tables is the candidate for elimination comprises determining whether the first table within the set of tables is not accessed or not ingested.

3. The method of claim 2, wherein determining whether the first table that has the greater width within the set of tables is not accessed or not ingested is performed according to a selected policy.

4. The method of claim 2, wherein the selected policy is configurable and predefined and the determining can be manually activated or can be automated.

5. The method of claim 3, wherein the selected policy is a time-based policy for an automatic detection and an automatic ejection of a plurality of inactive tables from a plurality of memory.

6. The method of claim 1, further comprising:
    determining whether the first table that has the greater width within the set of tables is in at least one of a state of normal, a state of ingest, and a state of ACCESS.

7. The method of claim 1, wherein creating the point-in-time snapshot copy of the respective metadata associated with the first table that has the greater width includes capturing a plurality of retrieval metadata and a plurality of ingestion metadata.

8. A computer system to increase memory scalability using a table-specific memory cleanup, the computer system comprising:
    one or more processors, one or more computer-readable memories, one or more non-transitory computer-readable tangible storage devices, and program instructions stored on at least one of the one or more non-transitory storage devices for execution by at least one of the one or more processors via at least one of the one or more memories, wherein the computer system is capable of performing a method comprising:
    determining whether a specific table within a set of tables is a first candidate for elimination;
    in response to determining the specific table within the set of tables is the first candidate for elimination, determining whether the specific table within the set of tables has a greater width than at least one other table within the set of tables that is a second candidate for elimination;
    eliminating the specific table and unloading a plurality of respective metadata associated with the specific table in response to the determination that the specific table within the set of tables is the first candidate for elimination and in response to determining that the specific table within the set of tables has the greater width than the at least one other table within the set of tables that is the second candidate for elimination, wherein unloading the plurality of respective metadata includes temporarily deactivating the first table that has the greater width;
    creating a point-in-time snapshot copy of the respective metadata associated with the first table;
    saving the created point-in-time snapshot on a disk;
    detecting an access of the first table; and
    constructing a plurality of respective table metadata structures using the saved created point-in-time snapshot, wherein the constructing is in response to detecting the access of the first table that has the greater width.

9. The computer system of claim 8, wherein determining whether the first table that has the greater width within the set of tables is the candidate for elimination comprises determining whether the first table within the set of tables is not accessed or not ingested.

10. The computer system of claim 9, wherein determining whether the first table that has the greater width within the set of tables is not accessed or not ingested is performed according to a selected policy.

11. The computer system of claim 9, wherein the selected policy is configurable and predefined and the determining can be manually activated or can be automated.

12. The computer system of claim 10, wherein the selected policy is a time-based policy for an automatic detection and an automatic ejection of a plurality of inactive tables from a plurality of memory.

13. The computer system of claim 8 further comprising: determining whether the first table that has the greater width within the set of tables is in at least one of a state of normal, a state of ingest, and a state of ACCESS.

14. The computer system of claim 8, wherein creating the point-in-time snapshot copy of the respective metadata associated with the first that has the greater width table includes capturing a plurality of retrieval metadata and a plurality of ingestion metadata.

15. A computer program product to increase memory scalability using a table-specific memory cleanup, the computer program product comprising:
one or more non-transitory computer-readable storage devices and program instructions stored on at least one of the one or more non-transitory tangible storage devices, the program instructions executable by a processor, the program instructions comprising:
program instructions to determine whether a specific table within a set of tables is a first candidate for elimination;
in response to determining the specific table within the set of tables is the first candidate for elimination, program instructions to determine whether the specific table within the set of tables has a greater width than at least one other table within the set of tables that is a second candidate for elimination;
program instructions to eliminate the specific table and unload a plurality of respective metadata associated with the specific table in response to the determination that the specific table within the set of tables is the first candidate for elimination and in response to determining that the specific table within the set of tables has the greater width than the at least one other table within the set of tables that is the second candidate for elimination, wherein unloading the plurality of respective metadata includes temporarily deactivating the first table that has the greater width;
program instructions to create a point-in-time snapshot copy of the respective metadata associated with the first table that has the greater width;
program instructions to save the created point-in-time snapshot on a disk;
program instructions to detect an access of the first table that has the greater width; and
program instructions to construct a plurality of respective table metadata structures using the saved created point-in-time snapshot, wherein the constructing is in response to detecting the access of the first table that has the greater width.

16. The computer program product of claim 15, wherein determining whether the first table that has the greater width within the set of tables is the candidate for elimination comprises determining whether the first table that has the greater width within the set of tables is not accessed or not ingested.

17. The computer program product of claim 16, wherein determining whether the first table that has the greater width within the set of tables is not accessed or not ingested is performed according to a selected policy.

18. The computer program product of claim 16, wherein the selected policy is configurable and predefined and the determining can be manually activated or can be automated.

19. The computer program product of claim 17, wherein the selected policy is a time-based policy for an automatic detection and an automatic ejection of a plurality of inactive tables from a plurality of memory.

20. The computer program product of claim 15, further comprising:
program instructions to determine whether the first table that has the greater width within the set of tables is in at least one of a state of normal, a state of ingest, and a state of ACCESS.

* * * * *